US012699044B2

(12) United States Patent
Ver Steeg et al.

(10) Patent No.: US 12,699,044 B2
(45) Date of Patent: Aug. 4, 2026

(54) PHOTONIC INTEGRATED CHIP FOR SPECTROSCOPY

(71) Applicant: Chamartin Laboratories LLC, Wilmington, DE (US)

(72) Inventors: Benjamin Ver Steeg, Redlands, CA (US); Craig Gardner, Belmont, MA (US); Haydn Frederick Jones, Ealing (GB)

(73) Assignee: Chamartin Laboratories LLC, Wilmington, DE (US)

( * ) Notice: Subject to any disclaimer, the term of this patent is extended or adjusted under 35 U.S.C. 154(b) by 89 days.

(21) Appl. No.: 18/058,455

(22) Filed: Nov. 23, 2022

(65) Prior Publication Data
US 2023/0204496 A1      Jun. 29, 2023

Related U.S. Application Data

(60) Provisional application No. 63/283,375, filed on Nov. 26, 2021.

(51) Int. Cl.
*G01N 21/27* (2006.01)
(52) U.S. Cl.
CPC ..... *G01N 21/274* (2013.01); *G01N 2201/121* (2013.01); *G01N 2201/12753* (2013.01); *G01N 2201/12792* (2013.01)
(58) Field of Classification Search
CPC .......... G01N 21/274; G01N 2201/121; G01N 2201/12753; G01N 2201/12792;
(Continued)

(56) References Cited

U.S. PATENT DOCUMENTS 11,298,057 B2    4/2022    Vizbaras et al.
11,896,373 B2 *  2/2024    Vizbaras ............... H01S 5/1032
(Continued)

FOREIGN PATENT DOCUMENTS

EP          3940900 A1      1/2022
WO     WO-2021/099369 A1   5/2021
WO     WO-2021/116766 A8   6/2021

OTHER PUBLICATIONS

International Search Report and Written Opinion, International Application No. PCT/IB2022/000715, from the International Searching Authority, mailed May 10, 2023, 19 pages.
(Continued)

*Primary Examiner* — Tarifur R Chowdhury
*Assistant Examiner* — Kemaya Nguyen
(74) *Attorney, Agent, or Firm* — Brownstein Hyatt Farber Schreck, LLP

(57) ABSTRACT

An optical sensor for spectroscopic analysis of a sample, the optical sensor comprising: a photonic integrated chip (PIC) for providing light to the sample, the PIC comprising: one or more laser(s) designed to operate at one or more respective predetermined wavelength(s), each of the one or more laser(s) having an output that is optically coupled to an optical output of the PIC; and a monitor located on the PIC for determining the wavelength of the optical output; the optical sensor further comprising: a detector for collecting a spectrum from the sample; and one or more processors configured to: compare the wavelength of the laser(s) at the optical output with each of their respective predetermined wavelength(s); and if a deviation above a certain threshold is detected between the wavelength of the laser(s) and the predetermined wavelength(s), adapt the collected spectrum to generate a reconstructed spectrum; and use one or more
(Continued)

datapoints from the reconstructed spectrum for the spectroscopic analysis.

18 Claims, 13 Drawing Sheets

(58) Field of Classification Search
CPC ......... G01J 2003/104; G01J 3/10; G01J 3/28; G01J 3/0297
See application file for complete search history.

(56) References Cited

U.S. PATENT DOCUMENTS

| | | | | | |
|---|---|---|---|---|---|
| 2010/0277726 | A1* | 11/2010 | Logan, Jr. | ................. | G01J 3/10 |
| | | | | | 356/326 |
| 2016/0091368 | A1* | 3/2016 | Fish | ......................... | G02B 6/34 |
| | | | | | 356/328 |
| 2017/0059410 | A1* | 3/2017 | Nishi | ...................... | G01J 3/443 |
| 2017/0059477 | A1* | 3/2017 | Feitisch | .................... | G01J 3/42 |
| 2018/0156718 | A1* | 6/2018 | Fleisher | ............. | G01N 33/0036 |
| 2018/0183513 | A1* | 6/2018 | Levesque | .............. | H04B 10/03 |
| 2019/0195688 | A1* | 6/2019 | Atabaki | ................ | G01J 3/0229 |
| 2021/0131873 | A1* | 5/2021 | Zeiler | ...................... | G01J 3/45 |
| 2023/0225643 | A1* | 7/2023 | Scofield | .............. | G02B 6/1228 |
| | | | | | 600/324 |
| 2023/0384514 | A1* | 11/2023 | Lee | ................... | G02B 6/12033 |

OTHER PUBLICATIONS

Brian Stern et al., "Athermal silicon photonics wavemeter for broadband and high-accuracy wavelength measurements" Optics Express, vol. 29, No. 19, Sep. 2021.
Qiang Liu et al., "Common-path dual-wavelength quadrature phase demodulation of EFPI sensors using a broadly tunable MG-Y laser" Optics Express, vol. 27, issue 20, 2019.

* cited by examiner

PHOTONIC INTEGRATED CHIP FOR SPECTROSCOPY

CROSS-REFERENCE TO RELATED APPLICATIONS

This application claims priority to U.S. Provisional Patent Application Ser. No. 63/283,375, filed Nov. 26, 2021 by Benjamin VER STEEG et al., entitled "Wavelength Monitoring and Control on a Photonic Integrated Circuit," the disclosures of which are incorporated herein by reference in their entirety for all purposes.

FIELD

One or more aspects of embodiments according to the present invention relate to a Photonic Integrated Chip (PIC), and more particularly to a PIC for spectroscopy applications.

BACKGROUND

When detecting, identifying, classifying, quantifying or monitoring a sample using optical spectroscopy, the exact wavelengths used in the application are important. When such a spectroscopic method is developed using a specific set of wavelengths, it may be advantageous to use the same wavelengths for all future measurements. For example, when using spectroscopy to determine how much water is present in a sample, a system and method using measurements at wavelengths $\lambda_1$, $\lambda_2$, $\lambda_3$, $\lambda_4$ and $\lambda_5$ will report an erroneous result if instead the system changes to using measurements at wavelengths $\lambda_2$, $\lambda_3$, $\lambda_4$, $\lambda_5$ and $\lambda_6$. In general, the larger the wavelength variation, the more erroneous the results will be.

Also, the smaller the signal of interest, the smaller the wavelength variation tolerance can be. For example, the wavelength variation tolerance will be larger when quantifying water in skin compared to quantifying glucose in skin, because water comprises ~65% of skin and glucose comprises only 0.1% of skin. In addition to the concentration of an analyte, the absorbance of an analyte at each given (predetermined) wavelength will have a great effect upon the strength of the signal measured.

Reducing the risk of erroneous results is particularly important when optical spectroscopy is being used to measure organic samples such as the skin of a user within in a healthcare or fitness setting, to measure one or more biomarkers of the user.

An example use of an optical spectrometer would be to compare between an individual and a standard (spectrum). In such a scenario, the measurement being made is not simply a "one-off" measurement but, instead is being made as part of a larger dataset. In such a scenario, a wavelength error in even one measurement is particularly undesirable as it could upset or skew the (much larger) dataset.

SUMMARY

The present invention aims to solve the above problems by providing, according to embodiments of a first aspect, an optical sensor for spectroscopic analysis of a sample, the optical sensor comprising: a photonic integrated chip (PIC) for providing light to the sample, the PIC comprising: one or more laser(s) designed to operate at one or more respective predetermined wavelength(s), each of the one or more laser(s) having an output that is optically coupled to an optical output of the PIC; and a monitor located on the PIC for determining the wavelength of the optical output; the optical sensor further comprising: a detector for collecting a spectrum from the sample; and one or more processors configured to: compare the wavelength of the laser(s) at the optical output with each of their respective predetermined wavelength(s); and if a deviation above a certain threshold is detected between the wavelength of the laser(s) and the predetermined wavelength(s), adapt the collected spectrum to generate a reconstructed spectrum; and use one or more datapoints from the reconstructed spectrum for the spectroscopic analysis.

Optional features of the invention will now be set out. These are applicable singly or in any combination with any aspect of the invention.

In one or more embodiments, the spectroscopic analysis includes application of an algorithm, one or more input values of the algorithm corresponding to datapoints corresponding to one or more of the predetermined wavelength(s).

If no error is present, the datapoints used as input values for the algorithm will correspond to real datapoints taken at each of laser wavelengths, which correspond to the predetermined wavelengths. If, however, the deviation between the actual wavelengths differs by more than a threshold from that of the predetermined ("golden") wavelengths, then a reconstructed spectrum will be generated, to determine what the spectrum would have looked like had irradiation of the sample taken place using lasers with wavelengths corresponding to the desired predetermined wavelengths. In this case, the datapoints are taken from the reconstructed spectrum. In other words, the reconstructed spectrum acts to convert the measurements back to a standardized set (the predetermined "golden" wavelengths), the application algorithm being programmed to carry out analysis at this standard set of wavelengths.

The type of errors corrected for may include:
1) Errors occurring at "time zero"—this may, for example, include variations in wavelengths arising as a result of the fabrication of the lasers.
2) Errors arising over time—this may, for example, include variations in wavelengths arising due to age and deterioration, or due to ambient conditions.

The range of wavelengths provided by the one or more lasers may include lasers of 400 nm-2400 nm. The wavelengths chosen will depend upon the biomarkers and/or applications of interest for a particular type of analysis (and therefore the algorithm being used for the spectroscopic analysis).

In one or more embodiments, the monitor is a wavelength monitor located on the PIC, wherein at least one of the one or more lasers is optically coupled to the wavelength monitor in addition to being optically coupled to the optical output of the PIC.

In one or more embodiments, the monitor is a temperature sensor configured to record the temperature of the PIC, which is then converted to a wavelength value via a predetermined calibration coefficient.

In one or more embodiments, the reconstructed spectrum is achieved via interpolation and/or extrapolation of values taken during a calibration stage.

Typically, the calibration stage is a "factory calibration" carried out during the manufacturing process.

In one or more embodiments, the interpolation is linear or spline interpolation.

In one or more embodiments, the one or more lasers is a plurality of lasers, and wherein a single wavelength monitor is shared by the plurality of lasers.

In one or more embodiments, the optical sensor further comprises one or more additional wavelength monitors; wherein the plurality of lasers are split into sub-groups; each sub-group of lasers being optically coupled to a respective wavelength monitor.

In one or more embodiments, the calibration stage includes one or more of: characterizing laser wavelengths emitted from the PIC, calibrating laser wavelength(s) emitted from the PIC as a function of drive conditions or external conditions; calibration of on-PIC sensor(s); calibration of wavemeter as a function of external conditions; and/or storing one or more predetermined wavelength(s).

In one or more embodiments, the predetermined laser wavelength(s) are aligned at quadrature points of the wavelength monitor.

In one or more embodiments, the PIC and the detector are located on a wearable device.

In one or more embodiments, the PIC further comprises one or more sensor(s) for measuring a condition of the chip. Optionally, the condition is one or more of: temperature, and laser drive current.

In one or more embodiments, the wavelength monitor comprises a wavemeter and a photodiode, wherein a drift in wavelength of light entering the wavemeter over time generates a drift in photocurrent measured by the photodiode over time. Optionally, the wavemeter comprises a Mach Zehnder interferometer (MZI). The MZI typically comprises one or more multimode interference (MMI) waveguides, that act as a power splitter/combiner, the length of the delay between two arms of the interferometer being controlled by the length of a waveguide.

In one or more embodiments, the optical coupling of the wavelength monitor to the respective output(s) of the one or more laser(s) takes the form of an optical tap, which taps less than 5% of the light from the one or more laser(s). In some embodiments the optical tap will tap less than 1% of the light (power) from the one or more lasers.

Optionally, the plurality of lasers are fixed wavelength lasers.

According to one or more embodiments of a second aspect, there is provided a method of spectroscopy, the method comprising:

providing the optical sensor as set out in the claims and the sections above;
  collecting a spectrum at the detector;
  adapting the collected spectrum to generate a reconstructed spectrum, in response to a measurement made by the monitor; and
  performing analysis on the reconstructed spectrum to obtain information about one or more biomarkers at the optical sample.

In one or more embodiments, an optical sensor according may be applied to solve a series of issues related to the use of a spectrometer sensor system comprised of multiple discrete lasers, including:

a) Uncorrectable manufacturing variation in sensor output wavelengths;
  b) Correctable laser wavelength variation (laser tuning) due to sensor aging and environmental changes (e.g. sensor temperature);
  c) Uncorrectable laser wavelength variation due to sensor aging and environmental changes (e.g. sensor temperature);
  d) Laser failure in production due to manufacturing defects; and/or
  e) Laser failure during normal sensor use.

Further optional features of the invention are set out below.

BRIEF DESCRIPTION OF THE DRAWINGS

Embodiments of the invention will now be described by way of example with reference to the accompanying drawings in which.

DETAILED DESCRIPTION

Figure 1A:
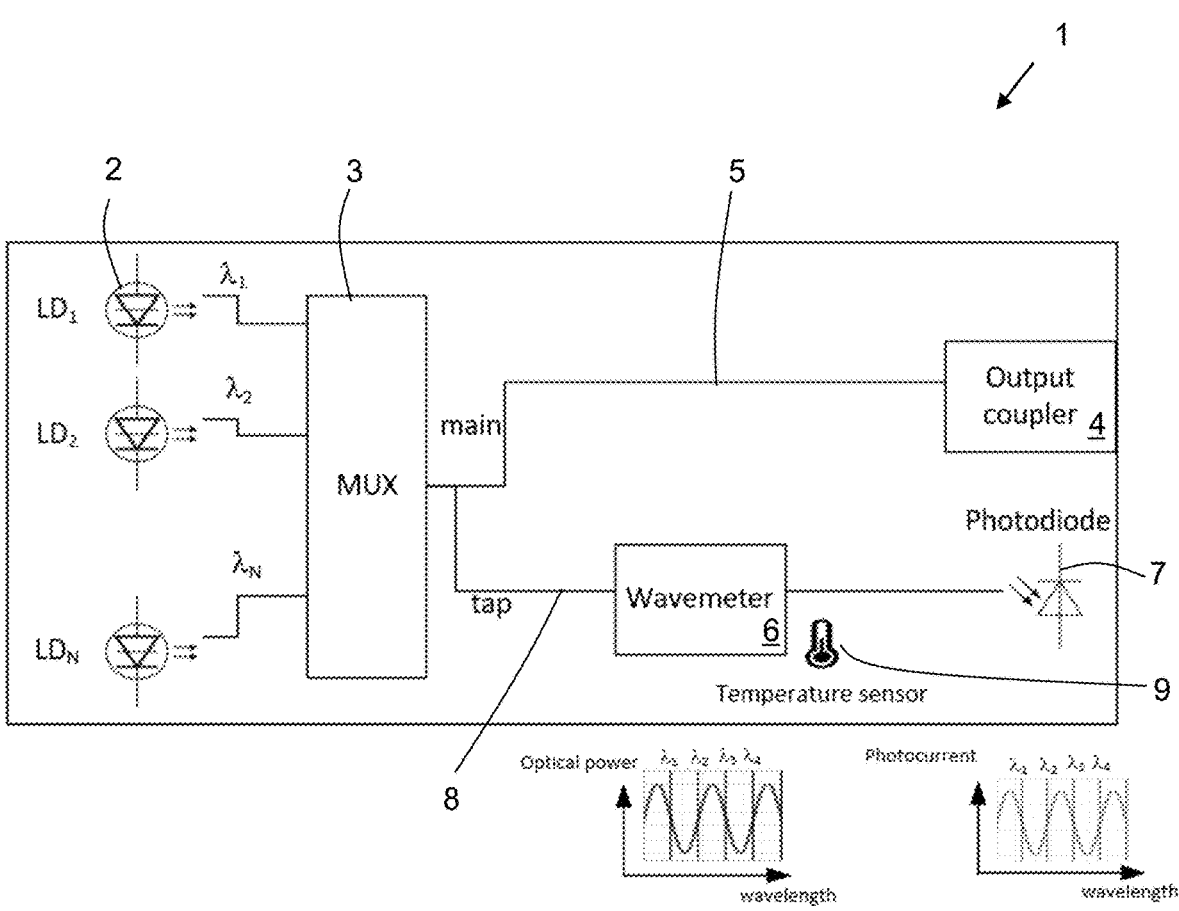
FIG. 1A shows a PIC according to an embodiment of the present invention.

The detailed description set forth below in connection with the appended drawings is intended as a description of exemplary embodiments of an optical sensor provided in accordance with the present invention and is not intended to represent the only forms in which the present invention may be constructed or utilized.

An optical sensor according to an embodiment of the present invention is described below, with reference to FIG. 1A, FIG. 1B, FIG. 1C, FIG. 2, and FIG. 11. The optical sensor 30 comprises a PIC 1 for generating light with which a sample 20 of interest can be illuminated in order for spectroscopic analysis to be carried out. The optical sensor may comprise, on the same PIC, or a different PIC, a detector 19 for recording light arriving from the sample 20 of interest.

The PIC 1 includes a plurality of light sources, in the form of a plurality lasers 2. In the embodiment shown, these lasers are on-chip lasers with a series of wavelengths $\lambda_1$, $\lambda_2$, $\lambda_3$, $\lambda_4$ . . . $\lambda_N$. Typically, each laser will have a different wavelength from all of the other lasers, but in some embodiments, the plurality of lasers may comprise two or more lasers having the same wavelength of operation. The lasers of the same wavelength may be in addition to other lasers of different wavelengths. In some embodiments, more than one laser within the plurality of wavelengths may have a "duplicate laser" of the same wavelength as itself.

Any suitable chip-based laser(s) may be used. Optionally, lasers may be Fabry Perot (FP) lasers, external cavity Distributed Bragg Reflector (DBR) lasers (which may include a Semiconductor Optical Amplifier (SOA), (more specifically an RSOA with a reflective surface)+grating), or Distributed-feedback lasers (DFB lasers).

Advantageously, the plurality of lasers may include one or more lasers having a RSOA gain, such as a III-V gain laser chips, or a coupon. The gain chip or coupon may be hybrid integrated to the PIC such that the optical mode in the RSOA or laser waveguide is edge-coupled to one or more wave-guides of the PIC.

The laser wavelengths provided may depend upon the intended use of the optical sensor, in other words, the spectroscopic analysis to be carried out. In some embodiments, laser wavelengths may fall within infra-red or short wave infra-red regions of the electromagnetic spectrum. Such wavelengths may be useful for absorption spectroscopy, for example absorption measurements of human or animal tissue. Spectroscopic analysis could include diffuse reflection absorption spectroscopy of a sample 20.

Alternatively, spectroscopic analysis may relate to analysis of chemical structure and/or composition of a sample 20. For example, material analysis may be carried out relating to the type of material (e.g. by molecular structure identification), or by quantity/concentration. Material analysis could encompass biological tissues, biological specimens/samples, industrial materials, and/or laboratory samples. In the embodiment shown in FIG. 1A, the PIC includes a multiplexer 3, which combines the respective optical outputs of the plurality of lasers to a single optical output coupler, which forms the optical output of the PIC.

Most of the light, for example 99% or more, from the lasers is sent to the output coupler 4 for emission out of the chip. This could be by way of a single waveguide 5 connecting the output of the multiplexer 3 to the output coupler 4.

A percentage of light, for example, in some embodiments 1% or less, is tapped via an optical tap 8 and is directed from one or more of the lasers (in this case the tap is located after the multiplexor), to a wavelength monitor. In the embodiment shown, the wavelength monitor takes the form of a wavemeter 6 and a photodiode (PD) 7.

The wavemeter has a known function of wavelength (e.g. sinusoidal). It is designed such that the laser wavelengths $\lambda_1$, $\lambda_3$, $\lambda_4$ . . . $\lambda_N$ are aligned at the quadrature points of the wavemeter, where the slope is the maximum. This alignment leads to maximum change in PD signal when the wavelength drifts.

Figure 1B:
FIG. 1B shows a PIC according to an alternative embodiment of the present invention.
Figure 1B:
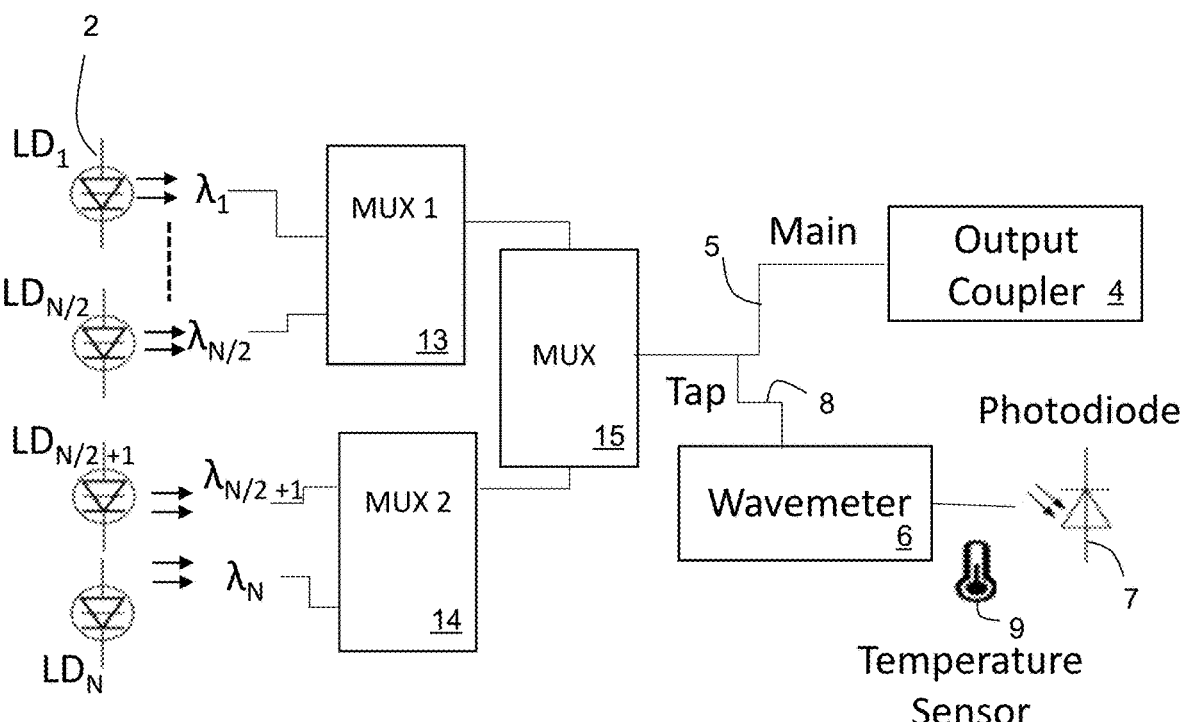
Figure 1C:
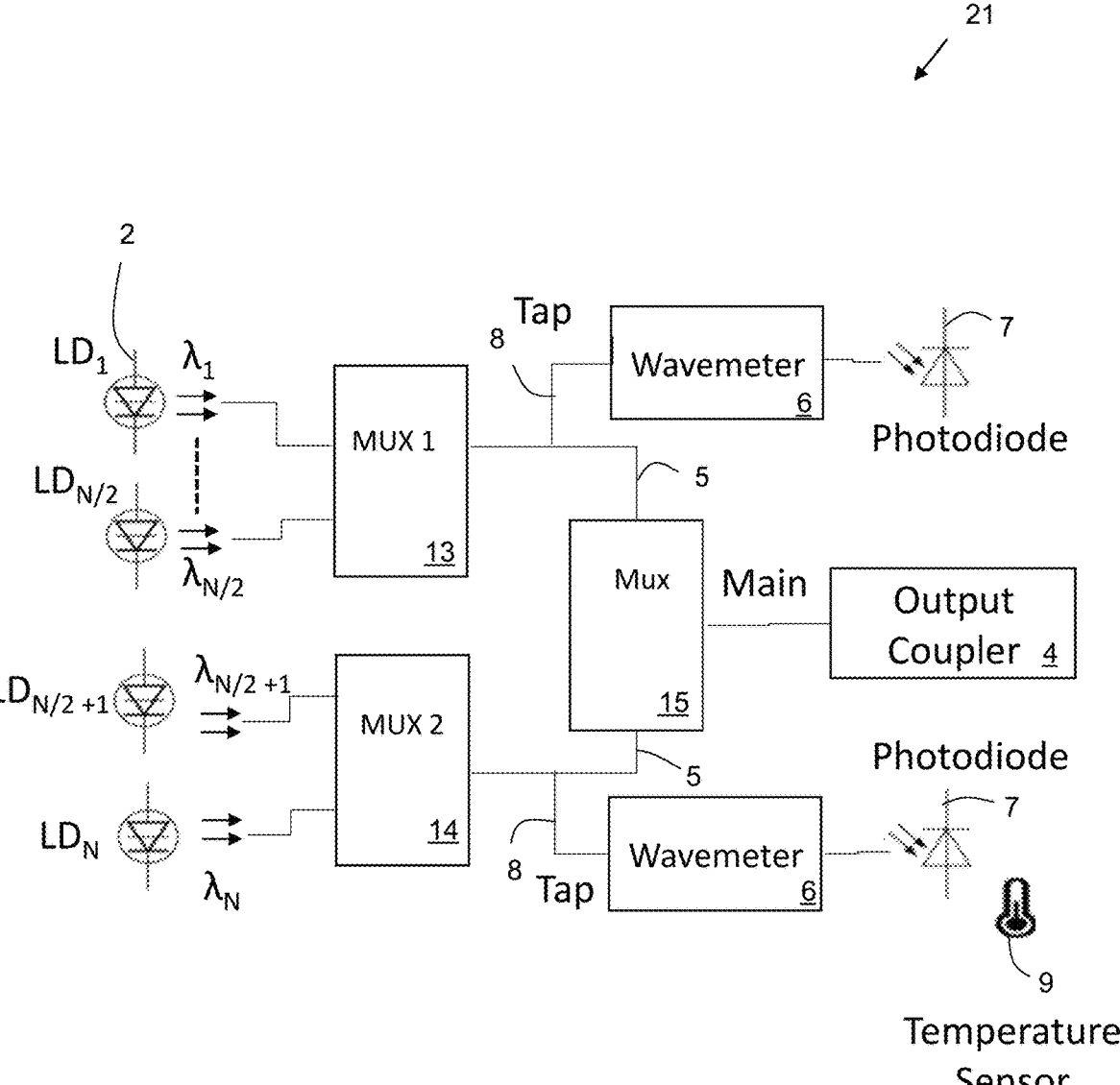
FIG. 1C shows a PIC according to an alternative embodiment of the present invention.

In a alternative embodiments, examples of which are depicted in FIGS. 1B and 1C, a plurality of multiplexors are used. Like reference numerals are used to illustrate features already described above in relation to FIG. 1A. In these alternative examples, the plurality of lasers may be grouped into sub-groups, and the outputs of each sub-group of lasers may be fed into a multiplexor for that group. For example, in the embodiment of FIG. 1B, outputs from a first sub-group of laser(s) are fed into a first multiplexor 13 and outputs from a second sub-group od laser(s) are fed into a second multiplexor 14. Each of the first and second multiplexors have a (relative) narrow band of operation. Each of the multiplexed outputs from the first multiplexor and second multiplexor are then fed into a further multiplexor 15, the further multiplexor having a relatively wide band of wavelengths over which it operates.

The embodiment shown in FIG. 1C differs from that of FIG. 1B in that it includes a plurality of wavemeters. In the embodiment of FIG. 1B, a tap is present after the wide band multiplexor to tap some light off to a single wavemeter and, in this case, temperature sensor 9. Monitoring is therefore carried out by the same components, regardless of wavelength. In the embodiment of FIG. 1C, a plurality of taps are present in the form of an optical waveguide through which a portion of the light is re-directed for monitoring. Each tap is located after one of the narrow band multiplexors but before the wide band multiplexor. Each optical tap directs light to a monitoring region, which may include a wavemeter and a photodiode. Where multiple wavemeters are present, they may be optimized for a given range of wavelengths.

Figure 2:
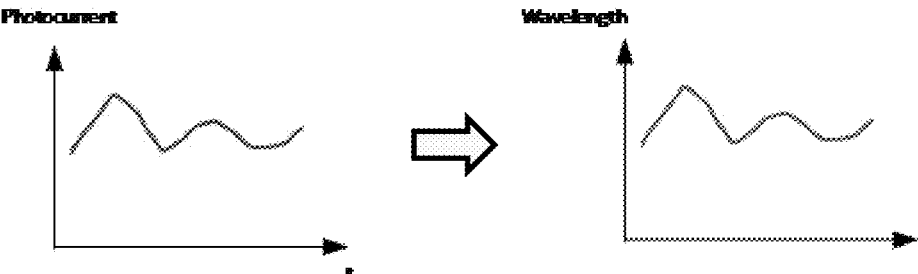
FIG. 2 shows an example photocurrent from a photodiode on the PIC, the photocurrent measured over time being used to measure wavelength drift over time.

In some embodiments, one laser is operated at a time. During laser operation, the photocurrent from PD is monitored. The drift of photocurrent over time can be translated into the laser wavelength drift over time, as shown in FIG. 2.

Temperature drift of PIC causes the wavelength shift of the wavemeter transmission spectrum and the PD response over wavelength, therefore its contribution needs to be subtracted from any photocurrent data. An on-chip temperature sensor can be used to monitor the temperature drift.

Figure 3:
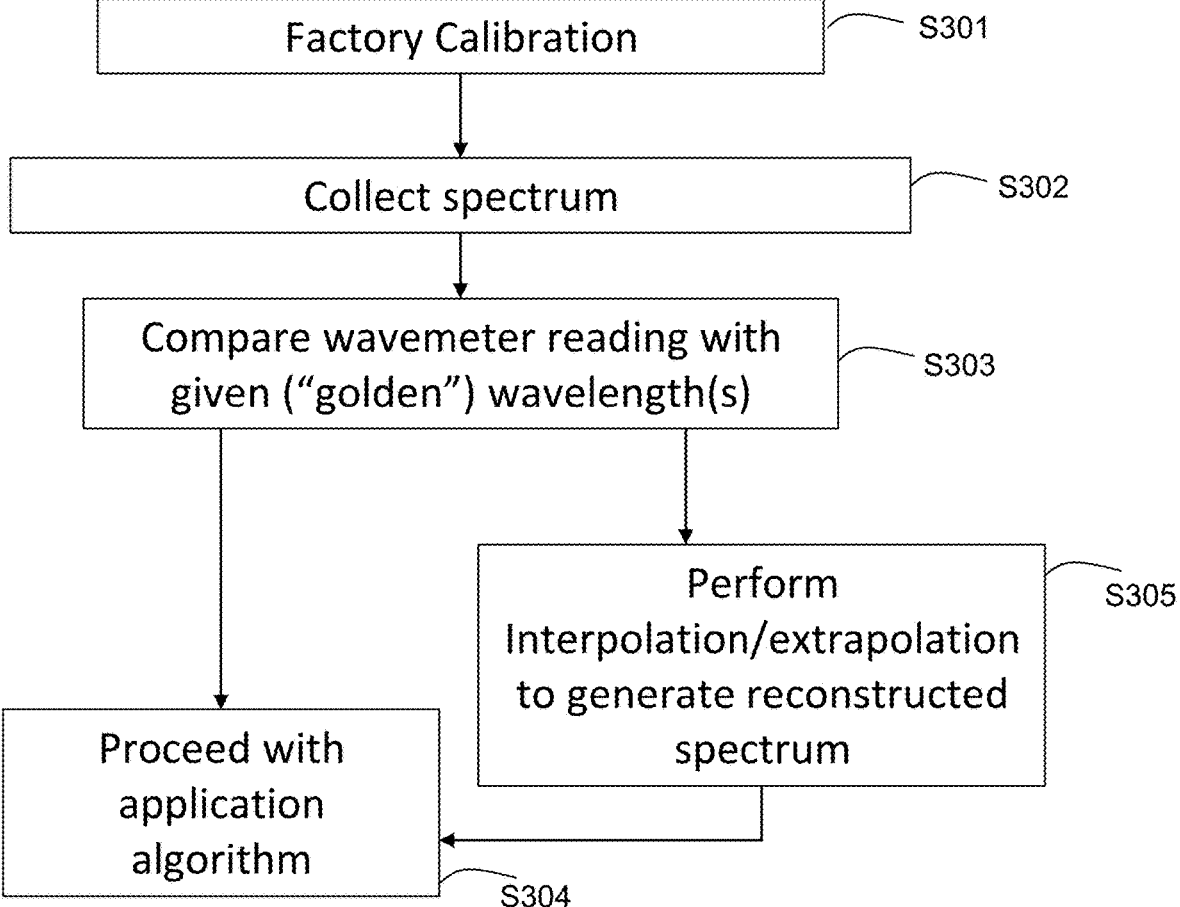
FIG. 3 shows an example process for setting up and using the PIC.
Figure 4:
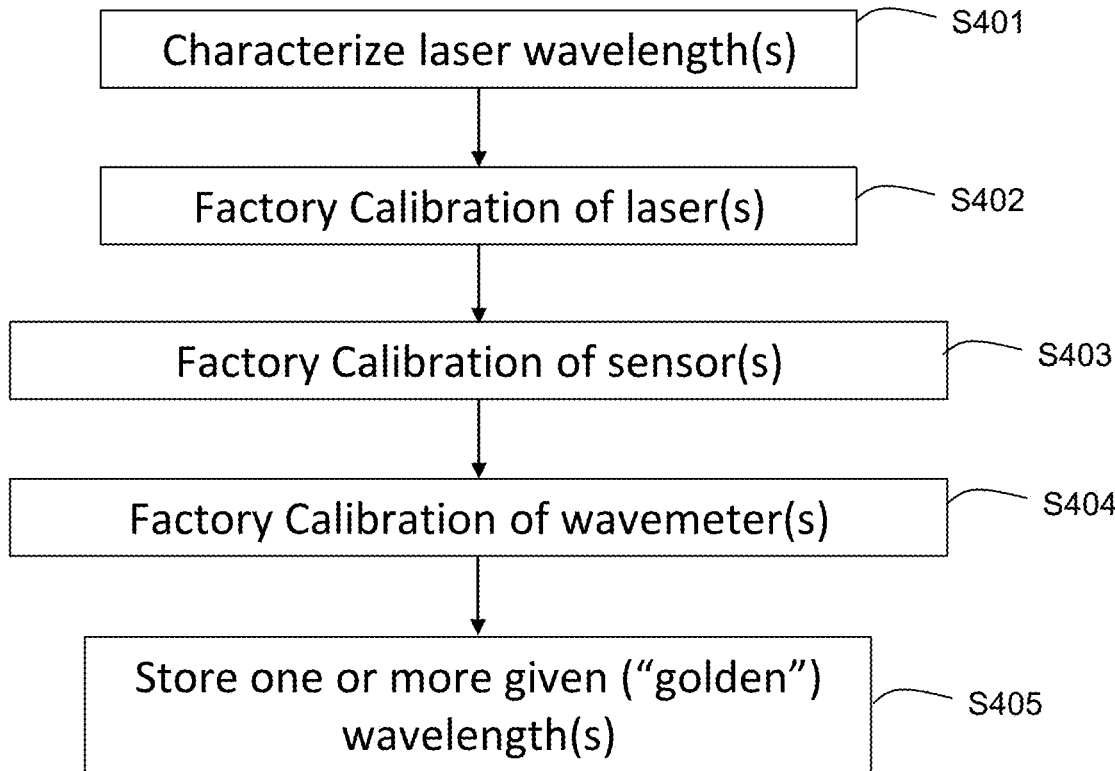
FIG. 4 depicts, in more detail, an example of a process for factory calibration of the PIC.
Figure 11:
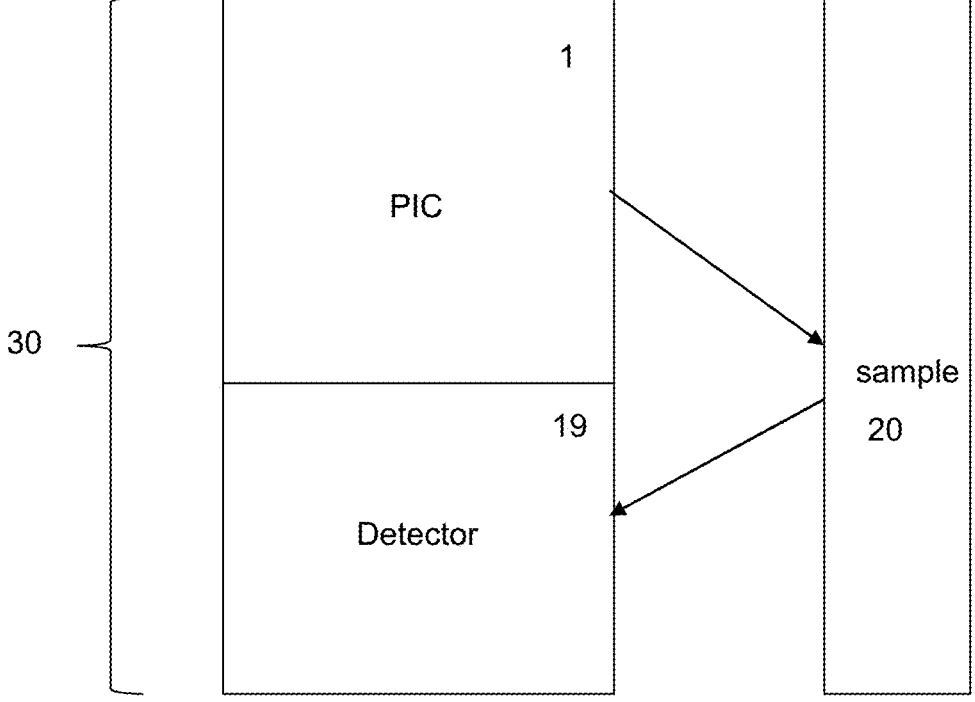
FIG. 11 depicts an optical sensor comprising a PIC which functions as a light source for illuminating a region on a sample, and also a detector for collecting a spectrum from the sample that has been illuminated.

A first method of operation of a spectrometer 30 including the PIC 1 of the present invention is described below with reference to FIGS. 3, 4 and 11, where FIG. 3 shows an example process for setting up and using the PIC and FIG. 4 depicts, in more detail, an example of a process for factory calibration of the PIC.

In this first method of operation, in-factory method steps carried out pre-use, include:

Characterizing S401 laser wavelengths emitted from the PIC, and, optionally accepting/rejecting one or more of the lasers for use;

Calibrating S402 laser wavelengths emitted from PIC as a function of conditions (laser drive current, temperature, etc.);

Calibrating S403 one or more on-PIC temperature sensors;

Calibrating one or more on-PIC wavemeters as a function of conditions (temperature, etc.);

Storing "golden wavelengths" used by the application algorithm, for example, to develop and train the algorithm. The 'golden wavelengths' are chosen to align with the quadrature points of one or more wavemeter-MZIs used on the PIC. In turn, the operating wavelength range intended for each MZI is chosen to align with spectrally significant portions of the overall wavelength span of the application.

The application algorithm may take the form of a quantitative bio spectrometry algorithm. For example, it may convert the optical measurements taken into biomarkers relating to e.g. glucose, urea.

Assuming that in-factory calibration steps have been carried out, the PIC is then ready to use as part of a wider spectrometer.

In use, a spectrum is collected S301 and at the same time, the wavelength of each laser is measured. The measured wavelengths are then compared to the golden wavelengths S303. If the measured wavelengths are within tolerance of the golden wavelengths, an application algorithm is applied S304. If the measured wavelengths are not within tolerance, a wavelength correction algorithm is applied S305.

Wavelength correction S304 can be interpolation/extrapolation of measured values at measured wavelengths to estimated values at golden wavelengths. For example, using linear or spline interpolation. In some embodiments, multiple algorithms are employed to handle faulty lasers. For example, for a system with 100 lasers, 100 algorithms may be embedded in order to handle each laser by itself being faulty and therefore not useable.

Figure 5:
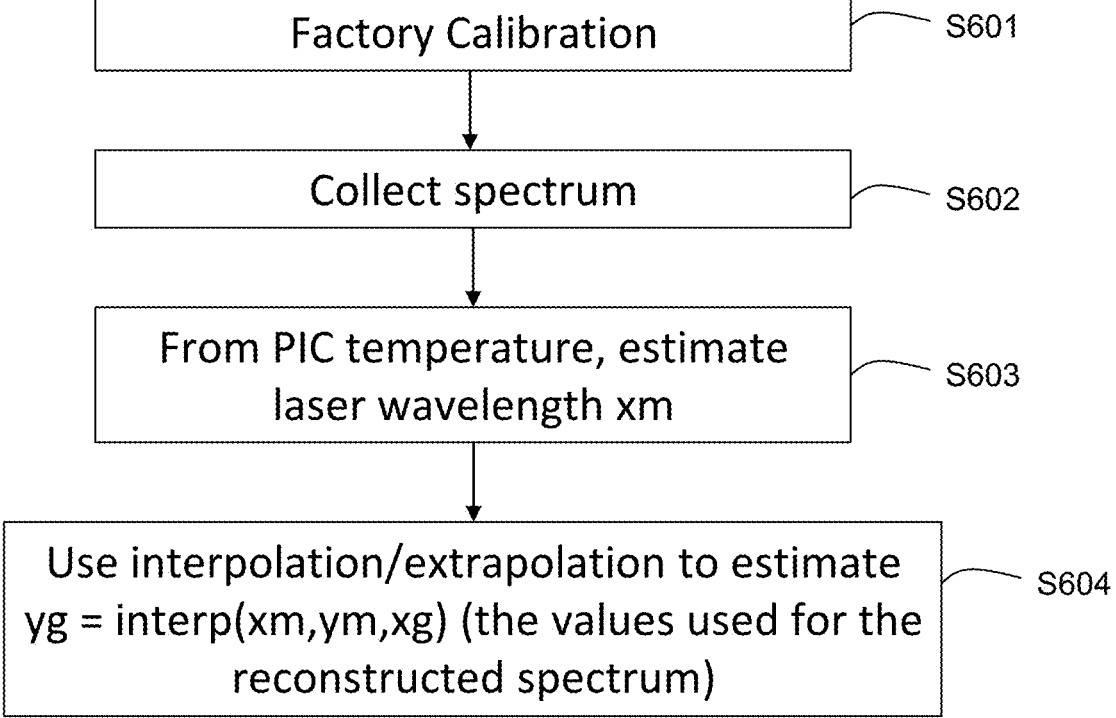
FIG. 5 depicts a further example of a process for data collection from a sample.
Figure 6:
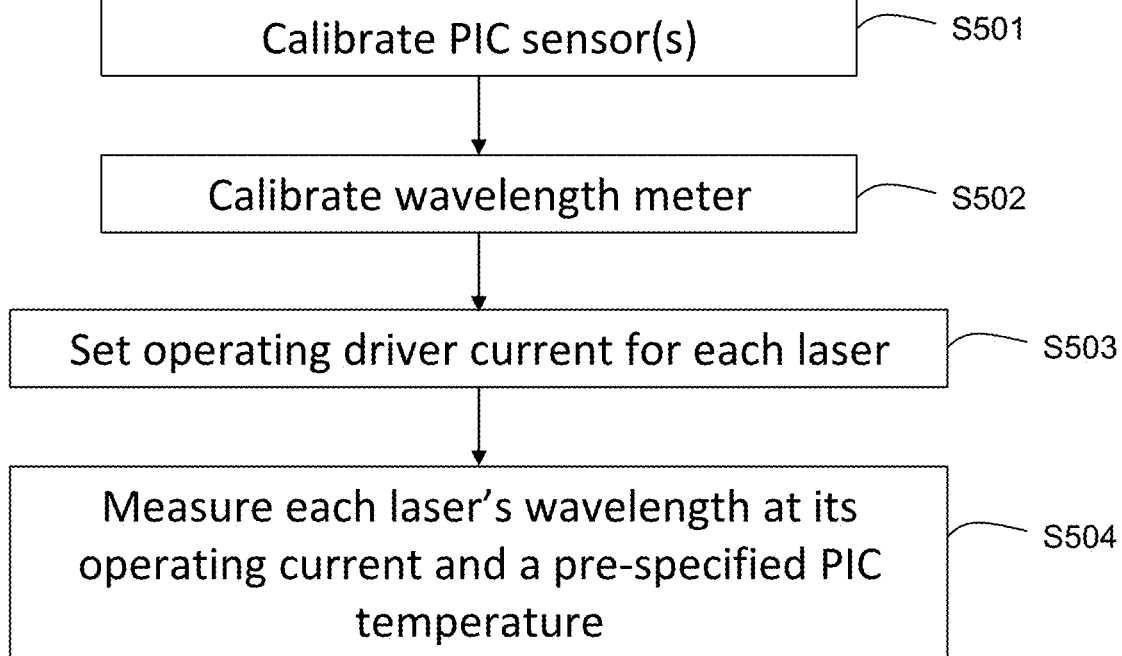
FIG. 6 depicts, in more detail, an example of a process for factory calibration of the PIC.

A second method of operation of a spectrometer including the PIC of the present invention is described below with reference to FIGS. 5 and 6, where FIG. 5 shows an example process for setting up and using the PIC and FIG. 6 depicts, in more detail, an example of a process for factory calibration of the PIC.

In the factory, as shown in FIG. 6, calibration steps S601 include:

Calibrating the PIC temperature sensor(s) S501;
Calibrating the wavelength meter over a range of temperatures (where calibration coefficients depend on temperature) S502;
Setting each of the one or more laser's operating driver currents S503; and
Measuring each laser's wavelength at its operating current and at a pre-specified nominal PIC temperature S504. From this, it is possible to estimate each laser's wavelength in the field if the PIC temperature is known.

In the field, for example when taking optical measurements from a sample such as the skin of a user, a spectrum $y_m$ is collected S602 and from the PIC temperature, the laser wavelengths $x_m$ are estimated.

Once $y_m$ and $x_m$ are known, interpolation/extrapolation can be used to estimate yg.

In any of the embodiments described herein, an example equation for generating reconstructed spectrum is:

$$\hat{y}_g = \text{interp}(x_m, y_m, x_g)$$

Figure 7A:
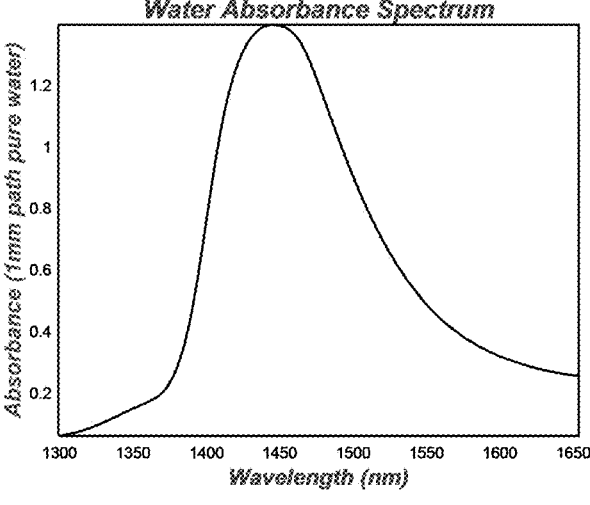
FIG. 7A shows an example of a water absorption spectrum.
Figure 7B:
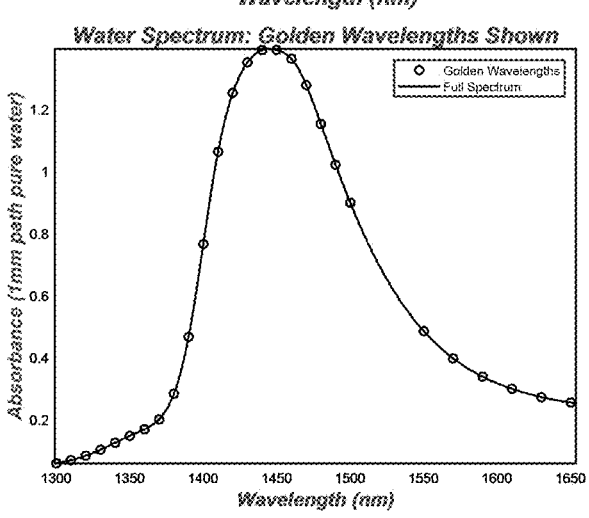
FIG. 7B shows a selection of "golden wavelengths" superimposed upon the absorption spectrum during calibration.
Figure 7C:
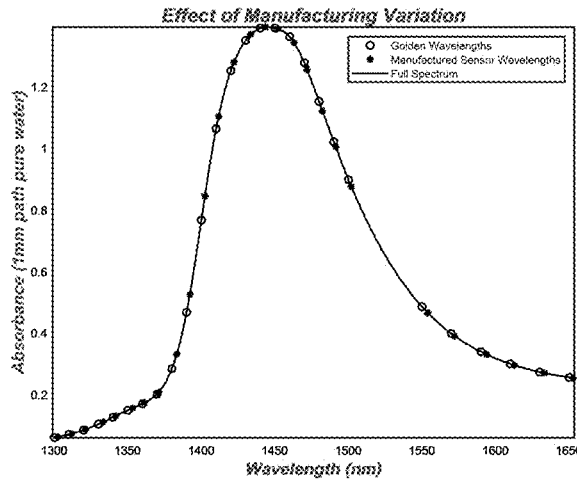
FIG. 7C shows manufactured sensor wavelengths during calibration.
Figure 10:
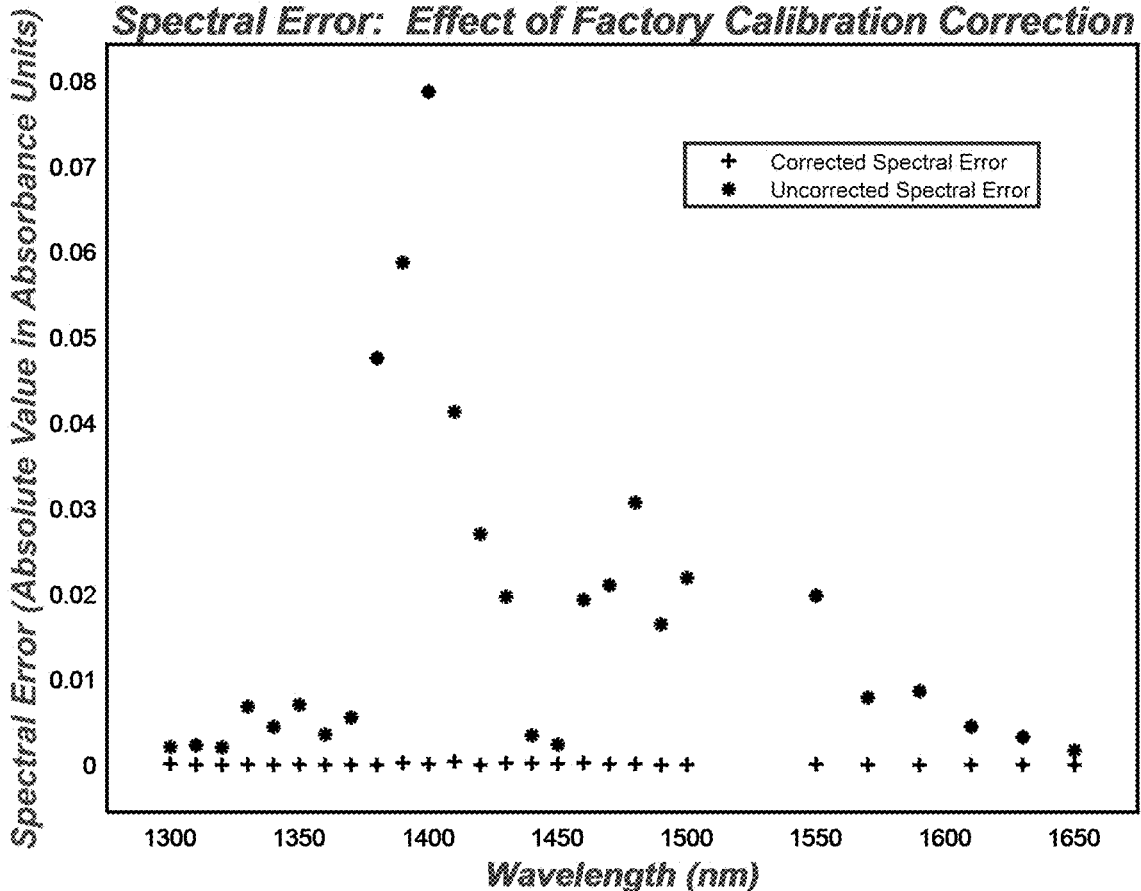
FIG. 10 plots the uncorrected spectral error of FIG. 8B and the corrected

Where:
x: vector of wavelengths
y: vector of absorbance values
m: measured
g: golden The effect of the interpolation process can be further understood with reference to FIGS. 7A-C; 8A-B, 9A-B, and FIG. 10.

An example of a water absorption spectrum is shown in FIG. 7A and points upon this spectrum marked on FIG. 7B at predetermined wavelengths, the "golden wavelengths", the wavelengths that the algorithm has been designed to operate at. Each laser sensor has a process variation in the actual laser wavelengths achieved in fabrication. The sensor "as manufactured" is characterized during factory calibration in order to provide accurate knowledge of the actual laser wavelengths. FIG. 7C shows the plot of FIG. 7B, including extra points, shown by asterixis, depicting the sensor wavelengths actually generated at fabrication, at time zero.

Subsequent spectral corrections are then based upon an accurate knowledge of the laser output wavelengths.

Figure 8A:
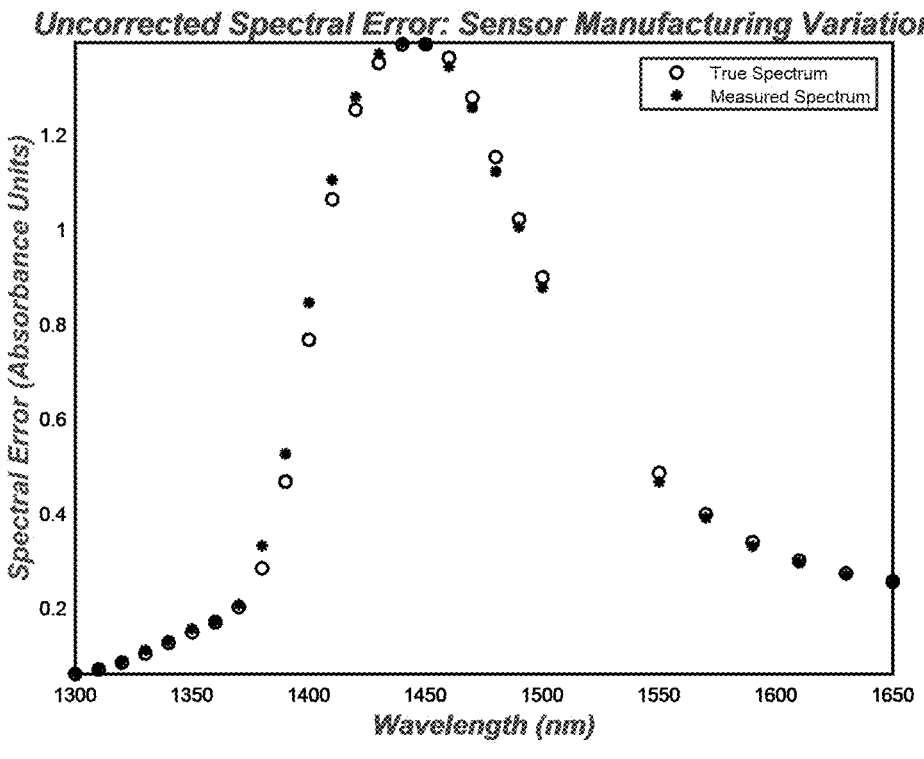
FIG. 8A shows an uncorrected spectral error due to manufacturing variation as well as the true spectrum for the same absorption peak.
Figure 8B:
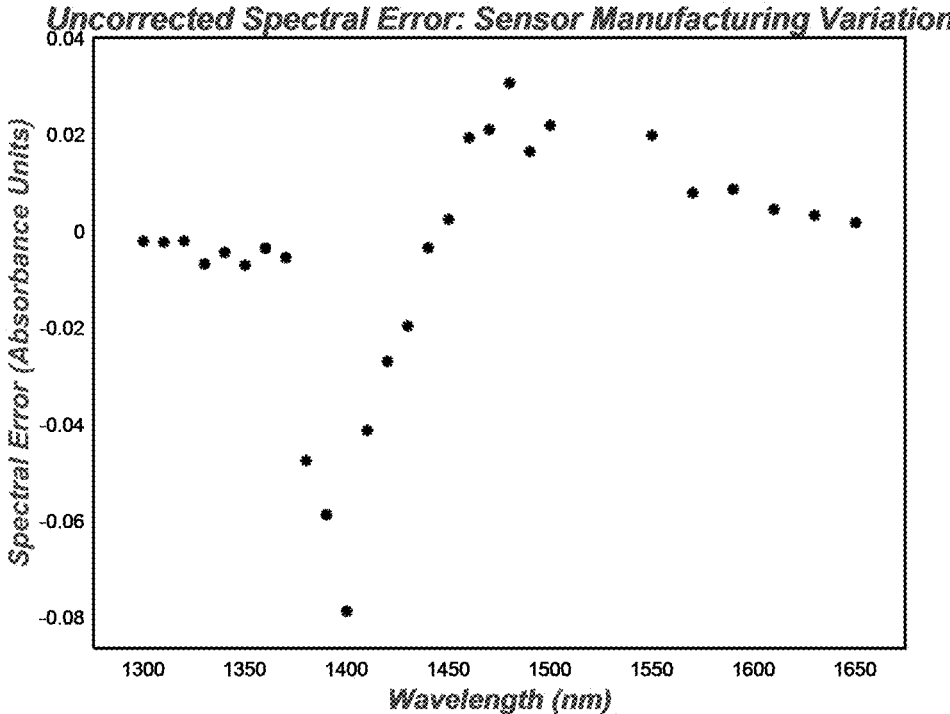
FIG. 8B shows the spectral error (i.e. the difference between the "true" value desired by the algorithm and the "measured" value at each of the predetermined "golden wavelengths") as a function of wavelength.

The effect of uncorrected spectral error is apparent from FIGS. 8A and 8B, where FIG. 8A shows an uncorrected spectral error due to manufacturing variation, superimposed on to the true spectrum for the same absorption peak. For each of the golden wavelengths, the difference between the true measurement and the uncorrected spectral measurement is shown plotted in FIG. 8B.

Figure 9A:
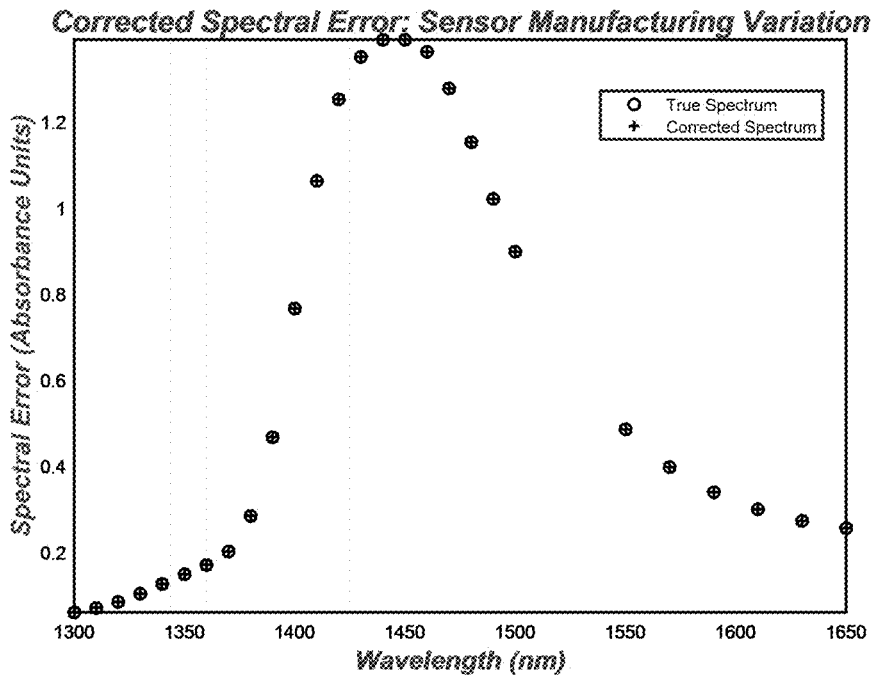
FIG. 9A shows a plot of the true spectrum and a corrected spectrum, after interpolation has taken place.
Figure 9B:
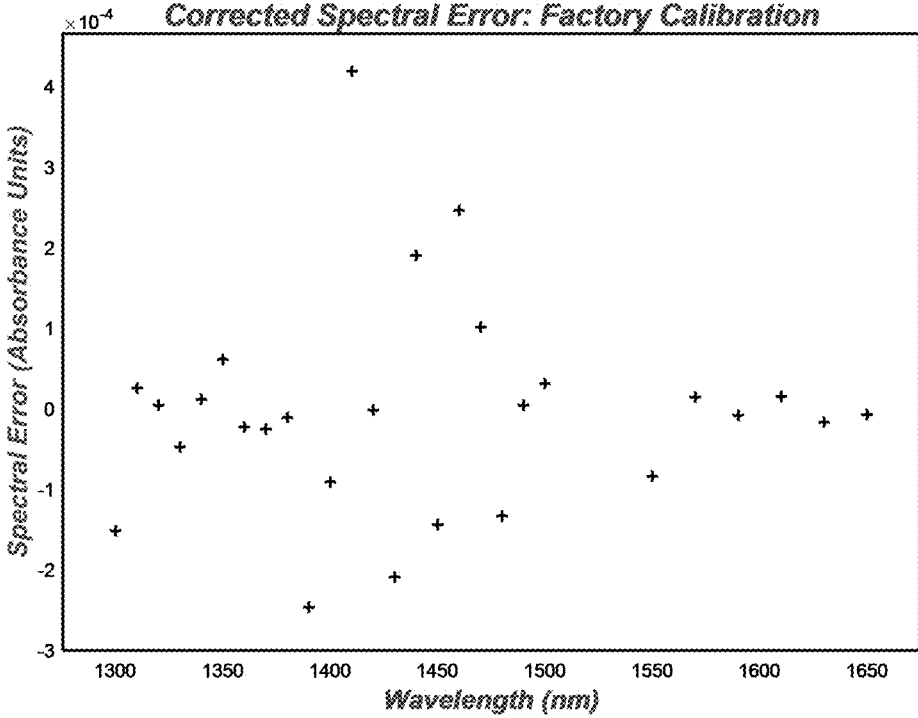
FIG. 9B shows a plot of the corrected spectral error, similar to that of FIG. 8B, but after interpolation has taken place.

Interpolation is carried out as described above, and as shown in FIG. 9A, where spline interpolation has been applied to correct the measured spectrum by estimating the absorbance values at the "Golden" laser wavelengths, the corrected spectrum produced. In the plot of FIG. 9A, it can be seen that the points of the corrected plot lie far closer to those of the true wavelengths. This is seen in even more detail in FIG. 9B which plots the difference. FIG. 10 shows both the uncorrected differences of FIG. 8B and the corrected differences of FIG. 9B on the same plot for comparison purposes.

The optical sensor may comprise a plurality of different monitors. For example, it may comprise a temperature sensor and a wavelength monitor. These may be used separately or in combination to determine the actual wavelength being output by the lasers, and therefore by the PIC. Once compared with the designed wavelengths ("golden wavelengths") for the application algorithm, if the difference is more than a predetermined value, the spectrum collected is reconstructed and the reconstructed spectrum used for the application algorithm.

During calibration, $(x_m, y_m)$ is first measured in the factory for each sensor, under a variety of conditions (change laser drive current, change temperature, change both, etc.). In this case, the sample a reproducible reflectance standard. During use of the spectrometer $(x_m, y_m)$ is then measured at run-time for each raw spectrum acquired. In this case, the sample is the true sample (wrist, skin, tissue, etc.).

The apparatus and methods described herein can be used to overcome various problems relating to manufacture and operation of optical spectrometers, particularly small PIC based spectrometers suitable for wearable devices. Two such examples are set out below, and it should be understood that other examples would be possible.

Example Problem 1: Uncorrectable Manufacturing Variation in Sensor Output Wavelengths Sensor variability in production may include:
i) Uncorrectable laser wavelength variability arising from fabrication
ii) Laser failure in production due to manufacturing defects For all practical integrated laser sensor designs, there will remain a fabrication tolerance in the output laser wavelengths relative to the intended design wavelengths. Sources of variation include material gain variability, errors in laser structure fabrication, and inherent variability in the laser drive circuitry. To a limited extent, laser drive characteristics (laser current and secondary temperature control subsystems) can be used to tune the laser to the desired output wavelength. This involves a factory calibration process.

After factory calibration, it is expected that some residual error remains between the laser wavelength and the intended design (which is used by the application algorithms). This residual error can be corrected algorithmically via one or more run-time methods.

Additionally, the complete failure of one or more lasers may occur and require correction. The PIC may be designed to include more laser wavelengths than the minimum number required for normal operation. This additional design feature allows for the use of interpolation or other algorithmic methods to reconstruct the desired spectrum even in the presence of one or more failed lasers Example Problem 2: Uncorrectable Errors Seen in Normal Use/Aging of the Sensors Sensor variability/failures during normal use and aging include:

i) Uncorrectable laser wavelength variation due to sensor aging and environmental changes (e.g. sensor temperature)

ii) Laser failure during normal sensor use

The inclusion of on-PIC wavelength monitoring optical subsystems allows for in-field correction of laser wavelength drift during normal sensor use. By monitoring both the sensor temperature and the output of the wavelength monitoring subsystems, it is possible to measure the actual laser output wavelength with high precision and accuracy. One or more run-time algorithm methods can then be used to reconstruct the spectrum at the "standard" or designed wavelength grid required by the application algorithms.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All references referred to above are hereby incorporated by reference.

What is claimed is:

1. An optical sensor for a spectroscopic analysis of a sample, the optical sensor comprising:

a photonic integrated chip (PIC) for providing light to the sample, the PIC comprising:

one or more laser(s) disposed on the PIC and configured to operate to output laser light at one or more respective predetermined wavelength(s), each of the one or more laser(s) having an output that is optically coupled to an optical output of the PIC;

a monitor disposed on the PIC and comprising a wavemeter disposed on the PIC and providing output to a photodiode likewise disposed on the PIC, the monitor configured to determine the wavelength of the optical output of each of the one or more laser(s); and a detector disposed on the PIC and configured to collect a spectrum from the sample; and one or more processors configured to:

compare the wavelength of the laser(s) at the optical output with each of their respective predetermined wavelength(s); and in accordance with a determination that a deviation above a threshold is detected between the wavelength of the laser(s) and the predetermined wavelength(s), adapt the collected spectrum to generate a reconstructed spectrum; and use one or more datapoints from the reconstructed spectrum for the spectroscopic analysis.

2. The optical sensor of claim 1, wherein the spectroscopic analysis includes application of an algorithm, one or more input values of the algorithm corresponding to datapoints corresponding to one or more of the predetermined wavelength(s).

3. The optical sensor of claim 1 wherein at least one of the one or more lasers is optically coupled to the wavelength monitor in addition to being optically coupled to the optical output of the PIC.

4. The optical sensor of claim 1 wherein the monitor comprises a temperature sensor configured to record the temperature of the PIC, which is then converted to a wavelength value via a predetermined calibration coefficient.

5. The optical sensor of claim 1 wherein the reconstructed spectrum is achieved via interpolation and/or extrapolation of values taken during a calibration stage.

6. The optical sensor of claim 5, wherein the interpolation is linear or spline interpolation.

7. The optical sensor of claim 1, wherein the one or more lasers is a plurality of lasers, and wherein a single wavelength monitor is shared by the plurality of lasers.

8. The optical sensor of claim 1, further comprising one or more additional wavelength monitors; wherein the plurality of lasers are split into sub-groups; each sub-group of lasers being optically coupled to a respective wavelength monitor.

9. The optical sensor according to claim 1 wherein the calibration stage includes one or more of: characterizing laser wavelengths emitted from the PIC, calibrating laser wavelength(s) emitted from the PIC as a function of drive conditions or external conditions; calibration of on-PIC sensor(s); calibration of a wavemeter as a function of external conditions; and/or storing one or more predetermined wavelength(s).

10. The optical sensor according to claim 1, wherein the predetermined laser wavelength(s) is/are aligned at quadrature points of the wavelength monitor.

11. A optical sensor according to claim 1 wherein the PIC and the detector are located on a wearable device.

12. The optical sensor of claim 1, wherein the PIC further comprises one or more sensor(s) for measuring a condition of the PIC.

13. The optical sensor of claim 12, wherein the condition is one or more of: temperature, and laser drive current.

14. The optical sensor of claim 1 wherein the wavelength monitor comprises a wavemeter and a photodiode, wherein a drift in wavelength of light entering the wavemeter over time generates a drift in photocurrent measured by the photodiode over time.

15. The optical sensor of claim 14, wherein the wavemeter comprises a Mach Zehnder interferometer (MZI).

16. The optical sensor of claim 1 wherein the optical coupling of the wavelength monitor to the respective output(s) of the one or more laser(s) takes the form of an optical tap, which taps less than 5% of the light from the one or more laser(s).

17. The optical sensor of claim 1, wherein the plurality of lasers are fixed wavelength lasers.

18. A method of spectroscopy, the method comprising:

providing the optical sensor according to claim 1;

collecting a spectrum at the detector;

adapting the collected spectrum to generate a reconstructed spectrum, in response to a measurement made by the monitor; and performing analysis on the reconstructed spectrum to obtain information about one or more biomarkers at the optical sample.

* * * * *